Jan. 5, 1937.  F. FISCHER  2,066,679
PRINTING APPARATUS FOR LENTICULATED FILMS
Original Filed Oct. 21, 1933  2 Sheets-Sheet 2
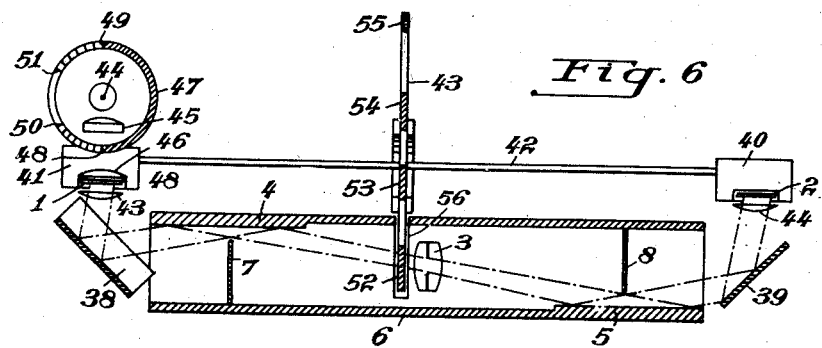
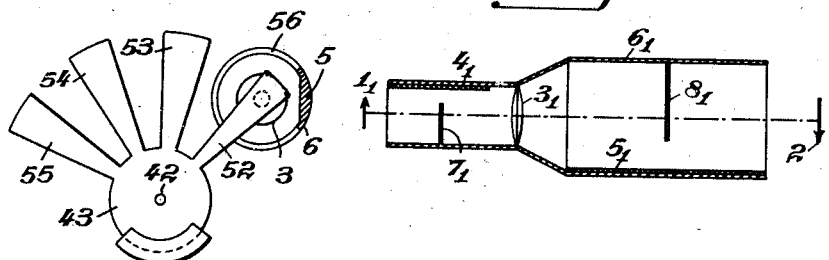
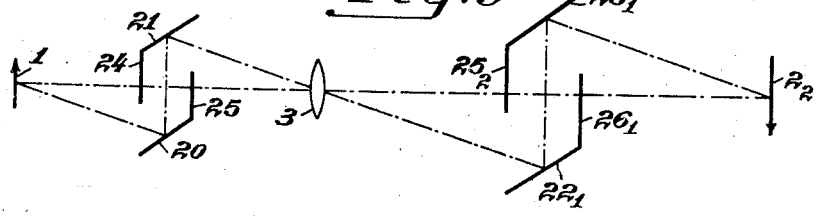
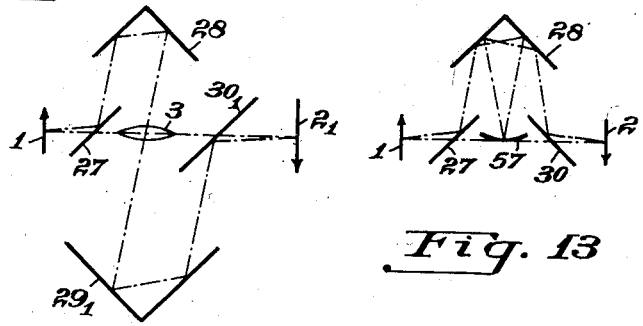
Fritz Fischer
INVENTOR.
BY: Gifford, Scull & Burgess
ATTORNEYS.

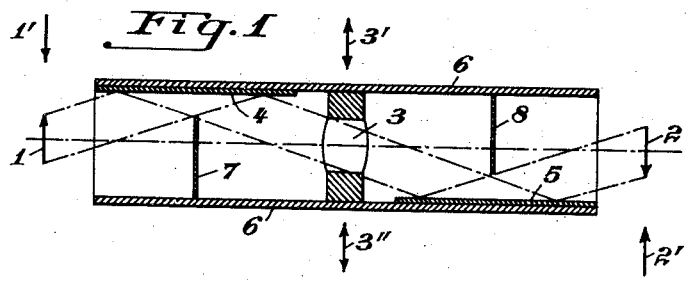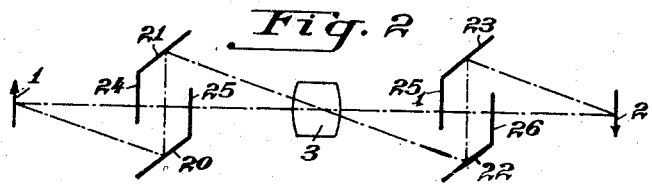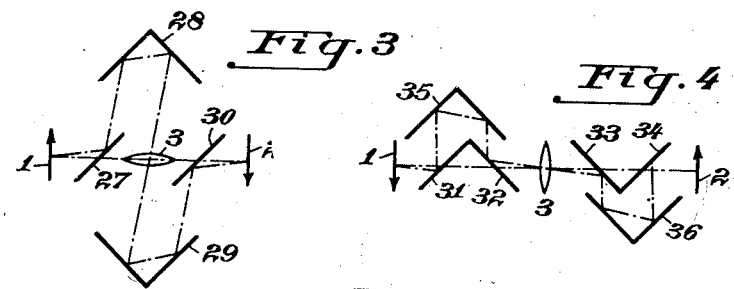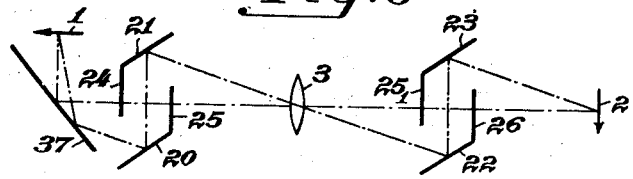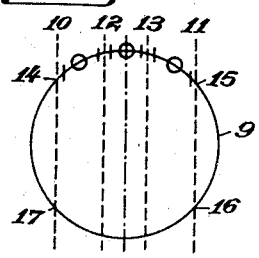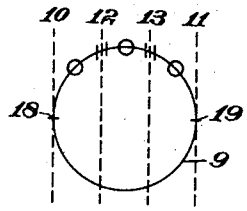
Fritz Fischer
INVENTOR
BY: Gifford, Scull & Burgess
ATTORNEYS.

Patented Jan. 5, 1937

2,066,679

UNITED STATES PATENT OFFICE 2,066,679

PRINTING-APPARATUS FOR LENTICULATED FILMS

Fritz Fischer, Berlin-Charlottenburg, Germany, assignor to Opticolor Aktiengesellschaft, Glarus, Switzerland, a corporation of Switzerland Application October 21, 1933, Serial No. 694,561
Renewed June 9, 1936. In Germany September 15, 1933.

13 Claims. (Cl. 88—24)

This invention relates to printing machines for lenticular films. More particularly it relates to such machines which are described in the patent application of Kurt Räntsch concerning a Printing apparatus for lenticulated films, filed September 8, 1933, Ser. No. 688,545.

These machines are characterized by an objective of small aperture, which images the origin film on the duplicate film, and by means for causing this aperture to be seen from the films, either simultaneously or subsequently, in different directions. Thus, though the aperture is small, all parts of the photographic layer lying behind the lenticular elements may be reproduced.

According to this invention the said means which cause the aperture to be seen in different directions are rotatably mounted. The chief advantage of such an arrangement is that a rotatory movement may be performed more exactly than an oscillating movement. It is much easier to get bearings for rotating devices of a machine, which secure a correct adjustment even after a long period of working. Further all optical parts may be rigidly fastened to each other, so that the correct relative adjustment too may be well secured. At last it is of utmost importance, that there are relatively small difficulties to be overcome when the frequency of a rotational movement is increased in contrast with an oscillating movement. If, for instance, the number of copied images is ten per second, which is quite normal regarding the rentability of printing machines, it is a hard task to arrange oscillating parts with sufficient exactness, while this is not the case with rotating parts.

Preferably, the new machines are so constructed that there are plane mirrors arranged between the objective and the films so that the films are seen from the objective in exactly opposite directions out of the optical axis. These mirrors are rotating round suitably chosen axes so that the images of the objective apertures, seen from the films, describe cycles, thus being seen subsequently in those different directions necessary for copying all parts of the photographic layer.

The films may preferably be placed parallel to each other and the axis of said rotational movement is so positioned as to pass through the centers of the images on the films, that means through the centers of the film-gates. Sometimes, fixed arranged optical means may be put in the path of rays, so that images of the films formed by said means are in parallel planes in contrast to the films themselves. Then the axis may pass through the centers of these images. Either the films or their images are perpendicular to the said axis. As was told already all movable parts may be rigidly fixed to a rotating carrier and it is advantageous with respect to a correct adjustment to fasten all optical parts to the same carrier. But it may also be preferable to put up the objective unmovable with respect to the films or the film-gates, then it being easier to arrange a shutter at the objective. This shutter intermits the exposure during the intervals, when the films are pulled and when those parts of the photographic layer are exposed which correspond to the boundaries between the filter-zones. The shutter may be also constructed as to prevent only the exposure of the said boundaries, further means near the light source being provided for interrupting the exposure during the movement of the films.— When the objective is immovably placed, its optical axis or the continuation of the axis passes through the centers of the images on the films or through the images of said centers, generated by immovable means.

Such means which are immovably fixed are for instance the plane mirrors, put up in front of the films, either in order to cause both films to be pulled within the same plane, which fact allows a very exact pull-down mechanism, or in order to get images which are correct with respect to the top and the bottom as well as with respect to their right and left hand sides. Especially for the last named purpose it is necessary to employ immovable optical means. Instead of simple plane mirrors optical squares, suitably mounted, may for instance be used.

Some examples of the new machines are explained by the help of the annexed drawings, of which Fig. 1 is a longitudinal sectional diagram illustrating one form of apparatus with which the invention may be practiced;

Figs. 2, 3, 4, and 5 are still more diagrammatic, illustrating different forms of apparatus which may be used in place of that appearing in Fig. 1;

Fig. 6 is a view similar to Fig. 1 but showing another form of apparatus which may be employed;

Fig. 7 is a view taken at right angles to Fig. 6 and illustrating the shutter shown in that figure;

Fig. 8 is a view similar to Fig. 1, but showing still another form of apparatus which may be used;

Figs. 9, 10, and 13 are diagrammatic views corresponding to Fig. 2 and showing still other arrangements which may be used in the practice of the invention;

Figs. 11 and 12 are diagrams which will be used in explaining the operation of the invention.

In Figure 1 the two films are placed at 1 and 2. The arrows are drawn so that the top of one arrow is imaged on the top of the other one. Thus, at once may be seen if the images are correct or not with respect to the top and bottom and with respect to right and left hand sides. The optical axis of the objective 3 passes through the centers of the images on the films 1 and 2. The plane mirrors 4 and 5 are parallel to each other and parallel to the optical axis so that, from the objective, the film 1 is seen at 1' and the film 2 at 2', 1' and 2' lying exactly in opposite directions. The mirrors are fastened to the carrier 6 which is mounted rotatably round a shaft, which collapses with the optical axis of the objective. The objective may be arranged either immovably with respect to the film gates or may be fastened to the carrier 6. In order to allow only such light which is reflected by the mirrors 4 and 5 to reach the duplicate film and in order to stop all unreflected light, the diaphragms 7 and 8 are suitably fixed to the carrier 6. In the position, represented in the figure, the objective is seen from the film 1 at 3' and from the film 2 at 3''. It may easily be seen, that the images 3' and 3'' of the objective are moving on circles when the carrier 6 and the mirrors 4 and 5 are rotating round the optical axis of the objective.

In order to explain the manner of action in full detail the Figures 11 and 12 may be analyzed. By the circles 9 of these figures the path which is taken by the image of the objective during one rotation is drawn. These images of the objective are seen from the films in the same distance as the front aperture of the kinematographic and the rear aperture of the photographic objective. Besides, the lines 10 and 11 are drawn so that they would be imaged by each of the lenticular elements on two lines, the distance of which is equal to the breadth of one lenticulation. Thus, if the objective used for taking or projecting purposes is, for instance, so constructed that a multicolor screen formed by three different zones is seen in the aperture, these three zones would be lying between the lines 10 and 11. The two lines 12 and 13 correspond, in this case, to the spots, where the boundaries between the adjacent zones of the filter are seen in the taking or projecting process. In order to copy all parts of the photographic layer, lying behind one lenticular element, it is necessary, that the image of the objective seen from the films passes over at least the maximum part of the region between the two lines 10 and 11. Therefore, in the Fig. 11, the aperture of the objective is drawn in several different positions between the points 14 and 15, in order to point out, that the duplicate film must be exposed, when the rotating means have such positions, that the said aperture is seen between the points 14 and 15. Those parts of the circle which are passed by the image of the objective while the exposure is effected are, as follows from the aforesaid, near a diameter which runs in parallel to the lenticular elements on the film. A better separation of the colors is performed by interrupting the exposure for short intervals of time, when the image of the objective crosses the lines 10, 11, 12 or 13.

The devices for interrupting the exposure may be performed in such a manner, that the film is also exposed while the objective is seen on the opposite side of its path, between the points 16 and 17. Then the films are pulled, while the objective is seen between the points 15 and 16 or 17 and 14.

Now must be observed that the two lines 10 and 11 are seen from the films by an angle which is equal to the relative opening of the lenticular elements, which is generally rather great, for instance f:2.5. When the circle 9 surpasses, as is drawn in Figure 11, both the lines 10 and 11, the films are always seen from the objective in directions forming rather great angles with the optical axis. This may have drawbacks caused by the following two reasons.

First, the light beams pass the objective very inclined; thus the image-field for which the objective is corrected must be very great, and the objective is effective for such directions, for which its state of correction is generally not the best. It is therefore necessary to use special types of objectives which are corrected for strongly inclined beams.

Next, the sharpest and best defined duplicate images on lenticulated films may be got, when, simultaneously, the layer of the origin film is imaged on the layer of the duplicate film and the lenticulated surface of the origin on the lenticulated surface of the duplicate. These two conditions being fulfilled, in a plane section perpendicular to the lenticular elements an exact imaging of the lenticular elements of the origin film on the lenticular elements of the duplicate film is secured, while in a plane section running in parallel to the lenticular elements an exact imaging of the layer of the origin film on the layer of the duplicate film is performed. Now, by the fact that the image of the objective is running on a circle, it is effective like an objective of large aperture so that the depth of sharpness is not sufficient. In the described example, this would have the consequence, that one duplicate image which is printed when the objective is seen between the points 14 and 15 is somewhat displaced, in parallel to the lenticular elements, as compared with the next duplicate image which is printed when the objective is seen between the points 16 and 17. For, in a plane section parallel to the lenticulations, an exact image of the layer of the origin film is formed somewhat in front of the lenticulations of the duplicate film and, as the beams are strongly inclined, the height of the image is a different one, if the objective is seen between 14 and 15 or between 16 and 17. The consequence is that the images, when being projected, show a small oscillation parallel to the lenticulations. On the contrary, the definition of the single images may be good as it is only a function of the real aperture of the objective which may be made small.

In order to prevent the described oscillation, it is preferable to expose the duplicate film only when the objective is seen between the points 14 and 15 and to pull the films onward during the rest of the time. The same effect is got by exposing the film only when the objective is seen between 16 and 17 and by pulling the films onward during the rest of this time.

Figure 12 serves for explaining a slight modification: The optical means are so arranged that the diameter of the circle 9 is approximately equal to the distance of the two lines 10 and 11. This has the advantage that the light beams passing the objectives are not so strongly inclined. One half of the circle 9 of Figure 12 is used for exposure, the other half for pulling the films. For instance, the exposure is performed while the objective is seen between 18 and 19. The fact that the light beams meeting the duplicate film vary the directions not only perpendicularly but also in parallel to the lenticulations, causes the component images corresponding to the marginal filter zones to be copied somewhat displaced as compared with the component image corresponding to the central filter zone. But this defect is smaller than that which may be observed when the intervals between 14 and 15 and between 16 and 17 of Figure 11 are used for exposure, as the diameter of the circle 9 of Figure 12 is smaller and as the sections are more close together. Besides, as was told already, the exposure is interrupted when the image of the objective crosses the lines 10, 11, 12 and 13, so that the sections near the lines 10 and 11, which would be especially disturbing, are not effective.

Attention must be paid to the fact that the intervals of time during which the image of the objective moves from the line 10 to the line 12 or from the line 13 to the line 11 are different from the intervals during which it moves from 12 to 13. If therefore, all component images are to be equally exposed the differences of the intervals must be compensated for. This may be done in different ways: Either the intensity of the light source is varied synchronously to the rotational movement of the optical parts, so that it lightens weaker when the lateral zones are exposed and stronger when the central zone is exposed. Or the openings of the shutter interrupting the exposure are provided with gray-glasses of varying thicknesses. Details of such a construction will be seen later on from Figure 6.

The aforesaid is correct for all machines which are examples of the invention. Referring now especially to Figure 1, the diameter of the circle 9 may be varied by varying the distance between the optical axis and the mirrors 4 and 5.

Another machine which is similar to that of Figure 1 but which has the advantage that unreflected light may be stopped more easily is drawn in Figure 2. The plane mirrors 20 through 23 are arranged, in parallel to each other and to the optical axis, between the objective and the films, so that the images 3' and 3" of the objective may be seen in the desired directions. The diaphragms 24 through 27 are joined to the mirrors so that no light beam may pass from the origin film to the duplicate film without being reflected. The mirrors and the diaphragms are fastened to a carrier so that they revolve round the optical axis of the objective. The objective may revolve as well or may be immovably fixed. The diameter of the circle 9 may be increased or decreased by increasing or decreasing the distance between the mirrors and the optical axis, the angle between the mirrors and the axis being correspondingly varied.

The films 1 and 2 or, more correctly spoken, the film-gates of the machine represented in Figure 3, too, are immovably mounted. The light passes the film 1, the plane mirror 27, the optical square 28 and the objective 3, the optical axis of which is perpendicular to the straight connection of the centers of the images on the films. Behind the objective the light passes the optical square 29, the plane mirror 30 and reaches the duplicate film 2. The mirrors 27 and 30 are parallel to each other and inclined by 45° against the said straight connection. Their normal lines are lying in a plane which contains also the optical axis of the objective. The edges of the optical squares are normal to that plane. The objective and the mirrors 27 through 30 are adjusted with respect to each other and rigidly fixed to a carrier rotatably round an axis which passes through the centers of the film-gates. The circle 9 may be varied by varying the distance between the optical axis and the squares 28 and 29.

The machine of Figure 4 is so constructed that the continuation of the optical axis of the objective 3 passes by the centers of the film-gates, where the films 1 and 2 are pulled. The plane surfaces 31 through 34, forming an angle of 45° with the optical axis are reflecting ones. Besides there are optical squares 35 and 36. The path of the light beams may easily be seen from the figure. The mirrors 31 through 36 revolve round the optical axis. By displacing the optical squares parallel to the optical axis the diameter of the circle 9 is modified.

All machines before described render duplicates on which the sides or the top and the bottom are interchanged as compared with the original. In order to avoid this drawback the machine represented by Figure 5 contains an immovably arranged mirror 37 between the film 1 and the reflecting surface 20. Else, the machine is constructed like that of Figure 2 so that no further explication is needed. The mirror 37 forms an angle of 45° with the optical axis of the objective so that the film 1 is seen at the same spot where the film 1 of Figure 2 is placed. The optical axis passes on one side through the center of the film-gate and on the other side through its image seen in the mirror 37.

It is preferable that the film-gates are lying within the same plane. Such a machine is drawn in Figure 6. Its essential optical parts are constructed in the same manner as those of Figure 1. But between the films and the mirrors 4 and 5 reflecting surfaces 38 and 39 are provided so that the gates may be placed in the same plane which is parallel to the optical axis. Thus the pull-down mechanisms 40 and 41 may be driven by the same axis 42. A shutter represented in Figure 7, may be fixed to the axis 42.

In order to cause the images on the duplicate film to correspond to the origin film as regards the correctness of the sides and the top and bottom, the mirror 38 is made up as an optical square interchanging the top and the bottom. The edge of this square is running in a plane defined by the normal line of the film 1 and by the optical axis. The cylindrical lenses 43 and 44 may be placed in front of the films in order to cause different distances of the focal plane from the objective in the sections parallel and perpendicular to the lenticular elements, the said distance in the parallel section being greater by about the thickness of a film than in the other section.

44 is a light source. It may be a long filament perpendicular to the direction of the lenticulations. As, in the figure, the lenticulations are transverse to the film and the film is perpendicular to the drawing plane, the filament 44 too is normal to the drawing-plane. The light is gathered on the origin film by the condenser lenses 45 and 46 which may partly be cylindrical. A cylindrically shaped shutter 47 rotates round the light source. The cylinder is impermeable to light between the points 48 and 49. Between the points 50 and 48 and between 49 and 51 gray-glasses are arranged for decreasing the intensity of light when the images corresponding to the lateral filter-zones are printed. The intensity of light which serves for printing the central zone may be unaffected, so that the drum is open between the points 50 and 51. This is in accordance with the fact, spoken of when Figure 12 was explained, that the time of exposure is somewhat longer for the marginal than for the central zones. Of course there may any gray-glasses be put at the openings of the drum, their transparencies being chosen as to reinforce or to weaken one color or the other.

A shutter 43 turns round the shaft 42 synchronously with the film-feeding mechanism, with the carrier 6 and with the shutter 47. The construction of the shutter 43 may be seen from the Figure 7 which is a sectional view taken perpendicularly to the shaft 42. 6 is the cylindrically shaped carrier for the mirrors 4 and 5. At its center the objective 3 with the small aperture may be seen. The shutter 43 has four segments 52 through 55 covering the aperture while the image of the objective crosses the lines 10, 12, 13 and 11 of the Figures 11 or 12. The carrier 6 has a slit 56 allowing the segments to pass by the objective. The exact interrupture of light is therefore effected by the shutter 43 near the objective, thus avoiding color-dominants on the images, which may sometimes be observed when the end and the beginning of exposure is defined by the shutter 47 near the light source. This shutter 47 serves only for stopping the light after the segment 55 has interrupted it. Similarly, the exact moment of the beginning of exposure is effected by the segment 52.

The new machines may not only be used for printing at a rate of 1:1 but also at any other rate. It is only necessary to arrange the optical means on one side of the objective in distances which are different of those on the other side, a necessity being that both films are seen in exactly opposite directions from the objective. The machines represented by the Figures 8, 9 and 10 serve for getting prints which are greater or smaller than the originals. They correspond so completely to the machines represented in the Figures 1, 2 and 3 that no further explication is needed.

Instead of refractory optical systems imaging the origin film on the duplicate film such systems may be used which are effective either by reflexion or by reflection and refraction. Figure 13 represents, for instance, such an arrangement which else is similar to that of Figure 3. The light passes the origin film 1, the mirror 27, the optical square 28 and reaches the reflecting image-forming system 57, which may either be made up of a mere concave mirror or of reflecting and refracting surfaces in combination. For instance a plane mirror may be placed behind an objective, which is corrected for imaging objects to infinity. From 57 the light passes once more the optical square 28 and then the mirror 30. At last it reaches the duplicate film 2. The optical square must be so arranged that its edge meets the optical axis of the objective. The mirrors 27, 28, 30 and the system 57 are rotatable round the straight connection of the centers of the film-gates.

I claim:

1. In combination, a film having thereon a multiplicity of lenticulations, an optical system comprising a lens through which and said film light may pass, optical means forming a virtual image of said lens at one side only of the optical axis thereof, and means to rotate at least part of said optical system with respect to said film and about the optical axis of the system, whereby said virtual image is caused to move about the axis of the system.

2. In combination, an original film and a copy film each having thereon a multiplicity of lenticulations, an optical system comprising a lens through which light may pass from the original film to the copy film and optical means forming a virtual image of said lens at one side of the optical axis thereof as viewed from either of said films, and means to rotate at least part of said optical system with respect to said films and about the optical axis, whereby said virtual image is caused to appear to move about said optical axis.

3. In combination, a film having thereon a multiplicity of lenticulations, an optical system comprising a lens through which and said film light may pass, optical means forming a virtual image of said lens at one side of the optical axis thereof, means to rotate at least part of said optical system with respect to said film and about the optical axis of the system, whereby said virtual image is caused to move about the axis of the system, and a diaphragm between said lens and said film and preventing the passage to the film of substantially all light except that used in forming said image.

4. In combination, an original film and a copy film each having thereon a multiplicity of lenticulations, an optical system comprising a lens through which light may pass from the original film to the copy film and optical means forming a virtual image of said lens at one side of the optical axis thereof as viewed from either of said films, means to rotate at least part of said optical system with respect to said films and about the optical axis, whereby said virtual image is caused to appear to move about said optical axis, and diaphragms between said lens and said films and preventing the passage to the films of substantially all light except that used in forming said images.

5. In combination, an original film and a copy film each having thereon a multiplicity of lenticulations, an optical system comprising a lens through which light may pass from the original film and to the copy film and optical means forming a virtual image of said lens at one side of the optical axis thereof as viewed fom either of said films, means to rotate at least part of said optical system with respect to said films and about the optical axis, whereby said virtual image is caused to appear to move about said optical axis and across the copy film twice, and means limiting the exposure of said copy film to one passage of said image across the film.

6. In combination, an original film and a copy film each having thereon a multiplicity of lenticulations, an optical system comprising a lens through which light may pass from the original film to the copy film and optical means forming a virtual image of said lens at one side of the optical axis thereof as viewed from either of said films, means to rotate at least part of said optical system with respect to said films and about the optical axis, whereby said virtual image is caused to appear to move about said optical axis and across the copy film in a curved path, and means to vary the amount of light reaching the copy film along said curved path.

7. In combination, an original film and a copy film each having thereon a multiplicity of lenticulations, an optical system comprising a lens through which light may pass from the original film to the copy film and optical means forming a virtual image of said lens at one side of the optical axis thereof as viewed from either of said films, means to rotate at least part of said optical system with respect to said films and about the optical axis, whereby said virtual image is caused to appear to move about said optical axis and across the copy film in a curved path, means to vary the amount of light reaching the copy film along said curved path, and means limiting the exposure of said copy film to one passage of said image across the film.

8. In combination, an original film having thereon a multiplicity of lenticulations and adapted to be used with a color filter having a plurality of zones and a group of color records behind each of said lenticulations, a copy film having similar lenticulations thereon, means for passing light through the original film to the copy film, an optical system comprising a lens through which light may pass from the original film to the copy film and optical means forming a virtual image of said lens at one side of the optical axis thereof as viewed from either of said films, means to rotate at least part of said optical system with respect to said films and about said optical axis, whereby said virtual image is caused to appear to move about said optical axis and across the copy film, and means to interrupt said light at such time as to avoid photographing on the copy film of the dividing lines between said records on the original film, to form on the copy film lines corresponding to said dividing lines.

9. In combination, an original film having thereon a multiplicity of lenticulations and adapted to be used with a color filter having a plurality of zones and a group of color records behind each of said lenticulations, a copy film having similar lenticulations thereon, means for passing light through the original film to the copy film, an optical system comprising a lens through which light may pass from the original film to the copy film and optical means forming a virtual image of said lens at one side of the optical axis thereof as viewed from either of said films, means to rotate at least part of said optical system with respect to said film and about said optical axis, whereby said virtual image is caused to appear to move about said optical axis and across the copy film, means to interrupt said light at such time as to avoid photographing on the copy film of the dividing lines between said records on the original film, to form on the copy film lines corresponding to said dividing lines, and means to vary the respective amounts of light passing to the copy film through the records on the original film.

10. In combination, an original film having thereon a multiplicity of lenticulations and adapted to be used with a color filter having a plurality of zones and a group of color records behind each of said lenticulations, a copy film having similar lenticulations thereon, means for passing light through the original film to the copy film, an optical system comprising a lens through which light may pass from the original film to the copy film and optical means forming a virtual image of said lens at one side of the optical axis thereof as viewed from either of said films, means to rotate at least part of said optical system with respect to said film and about said optical axis, whereby said virtual image is caused to appear to move about said optical axis and across the copy film, and means to vary the respective amount of light passing to the copy film through the records on the original film.

11. In combination, a film having thereon a multiplicity of lenticulations, a lens through which and said film light may pass, a diaphragm disposed between said film and lens and preventing direct viewing of one from the other, means to deflect light passing through the lens and film past said diaphragm, and means to rotate said deflecting means about the axis of the lens.

12. In combination, an original film having thereon a multiplicity of lenticulations and adapted to be used with a color filter having a plurality of zones and a group of color records behind each of said lenticulations, a copy film having similar lenticulations thereon, means for passing light through the original film to the copy film, an optical system comprising a lens through which light may pass from the original film to the copy film and optical means forming a virtual image of said lens at one side of the optical axis thereof as viewed from either of said films, means to rotate at least part of said optical system with respect to said film and about said optical axis, whereby said virtual image is caused to appear to move about said optical axis and across the copy film, a source of light adapted to pass light through said original film to the copy film, and a shutter adapted to interrupt said light during movement of said virtual image across the copy film in one direction and having an opening permitting light to pass while said image is moving across the copy film in the opposite direction, said opening having transparencies disposed thereover adjacent its edges for the purpose set forth.

13. In combination, an original film having thereon a multiplicity of lenticulations and adapted to be used with a color filter having a plurality of zones and a group of color records behind each of said lenticulations, a copy film having similar lenticulations thereon, means for passing light through the original film to the copy film, a source of light to illuminate said original film, and a rotatable shutter surrounding said source of light and having an opening therein to pass said original film at regular intervals during rotation of the shutter about the source of light, said opening having transparent members disposed thereover adjacent its edges to decrease the amount of light passing through those parts of the opening for the purpose set forth.

FRITZ FISCHER.